US008972483B2

(12) United States Patent
Gregersen

(10) Patent No.: US 8,972,483 B2
(45) Date of Patent: Mar. 3, 2015

(54) METHOD AND SYSTEM FOR PROVIDING CONNECTIVITY BETWEEN CLIENTS CONNECTED TO THE INTERNET

(75) Inventor: Carsten Rhod Gregersen, Brabrand (DK)

(73) Assignee: NABTO APS, Arhus N (DK)

( * ) Notice: Subject to any disclaimer, the term of this patent is extended or adjusted under 35 U.S.C. 154(b) by 729 days.

(21) Appl. No.: 12/812,351

(22) PCT Filed: Feb. 20, 2008

(86) PCT No.: PCT/DK2008/050043
§ 371 (c)(1),
(2), (4) Date: Sep. 24, 2010

(87) PCT Pub. No.: WO2009/103291
PCT Pub. Date: Aug. 27, 2009

(65) Prior Publication Data
US 2011/0055322 A1    Mar. 3, 2011

(51) Int. Cl.
*G06F 15/16* (2006.01)
*H04L 29/06* (2006.01)
*H04L 29/12* (2006.01)
*H04L 29/08* (2006.01)

(52) U.S. Cl.
CPC ........ *H04L 63/029* (2013.01); *H04L 29/12103* (2013.01); *H04L 61/1535* (2013.01); *H04L 67/2814* (2013.01); *H04L 67/02* (2013.01)
USPC ............................ 709/203; 709/223; 715/769

(58) Field of Classification Search
USPC ........................................................ 709/203
See application file for complete search history.

(56) References Cited

U.S. PATENT DOCUMENTS

| 8,086,740 | B2* | 12/2011 | Tyukasz et al. | 709/227 |
| 2002/0046293 | A1 | 4/2002 | Kabata et al. | |
| 2004/0255005 | A1* | 12/2004 | Spooner | 709/218 |
| 2005/0229243 | A1 | 10/2005 | Svendsen et al. | |
| 2006/0117097 | A1* | 6/2006 | Ogasawara et al. | 709/223 |

(Continued)

FOREIGN PATENT DOCUMENTS

| CN | 1742265 A | 3/2006 |
| CN | 101044772 A | 9/2007 |

(Continued)

OTHER PUBLICATIONS

First Office Action dated Jul. 17, 2012 from the Chinese Patent Office for Application No. 200880126827.X.

(Continued)

*Primary Examiner* — Hamza Algibhah
(74) *Attorney, Agent, or Firm* — Ladas & Parry LLP

(57) ABSTRACT

A method and a system (5) for identifying and connecting clients (1a-1d) connected to the same network (2) comprising a control server (6), performing the steps of connecting a first client (1a-1d) running a web browser application (4a-4d) to the control server (6) and registering client specific connection information associated with the first client, receiving from the web browser application (4a-4d) a request for an unique URI defined by the control server (6) and associated with a second client (1a-1d), requesting the control server (6) to mediate a connection to the second client (1a-1d) associated with the unique URI and receiving data from the second client (1a-1d) on the direct connection and forwarding the data to the web browser application (4a-4d) for displaying the received data in a graphical user interface.

14 Claims, 2 Drawing Sheets

(56) References Cited

U.S. PATENT DOCUMENTS

Figure 1:
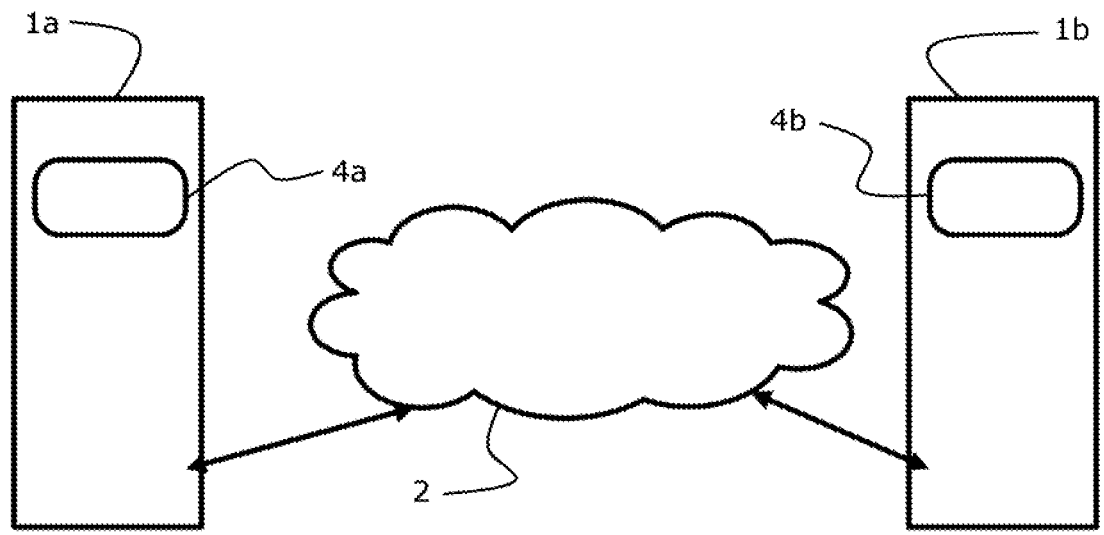

| | | | |
|---|---|---|---|
| 2006/0224759 A1* | 10/2006 | Fang et al. | 709/231 |
| 2007/0157101 A1* | 7/2007 | Indiran et al. | 715/769 |
| 2007/0157303 A1* | 7/2007 | Pankratov | 726/11 |
| 2008/0068289 A1* | 3/2008 | Piasecki | 345/2.1 |
| 2009/0052435 A1 | 2/2009 | Nakamura et al. | |
| 2012/0117156 A1* | 5/2012 | Anka | 709/205 |

FOREIGN PATENT DOCUMENTS

| | | |
|---|---|---|
| JP | 2002-33773 A | 1/2002 |
| JP | 2005-531049 A | 10/2005 |
| JP | 2006-254160 A | 9/2006 |
| JP | 2007-235556 A | 9/2007 |
| WO | 03/019415 A | 3/2003 |
| WO | 03/093990 A2 | 11/2003 |
| WO | 2007/026997 A | 3/2007 |

OTHER PUBLICATIONS

First Office Action dated Oct. 30 2012 from the Japanese Patent Office for Application No. 2010-547045.
espacenet English abstract of JP 2002-33773 A.
espacenet English abstract of JP 2005-531049 A.
espacenet English abstract of JP 2007-235556 A.
espacenet English abstract of JP 2006-254160 A.
espacenet English abstract of CN 101044772 A.
espacenet English abstract of CN 1742265 A.

\* cited by examiner

METHOD AND SYSTEM FOR PROVIDING CONNECTIVITY BETWEEN CLIENTS CONNECTED TO THE INTERNET

The present invention relates to a method and a system for identifying and connecting clients connected to the same network such as the Internet by using a control server.

A major part of the communication on the Internet is based on web browsers running on clients such as personal computers. Web browsers simply interpret information provided from servers on the Internet such as HTML pages comprising pictures and Java applets and display the content in a graphical user interface such as a computer screen. Internet users are very familiar using web browsers and the web browser as an application is therefore a very important tool for providing access to content made available on the Internet. Due to the popularity of web browsers, their functionality has been extended to include features such as FTP file transfer and reading RSS feeds in order to make this widespread application even more suitable for accessing content and information made available on the Internet.

However, in order to access content and information with a web browser, the desired content or information must be made available on central web servers adapted to provide web services. There exist several services for uploading content to the web servers making it available to all Internet users and even web based services, which provide for private sharing of content and information. It is by most users considered as a tedious and to some users even a difficult task to share content, such as digital pictures and video clips with other entrusted Internet users by uploading the content to a web server. One other even more difficult solution is setting up a private server for sharing content such as a web server or a FTP server.

The difficulty in directly connecting clients connected to the Internet, which could be considered as an alternative approach, lies in the fact that only few of the clients connected to the Internet have fixed IP addresses and in that most clients due to the hostile nature of the Internet towards unprotected systems, reside behind firewalls. Hence, in practice private clients connected to the Internet are not a part of the Internet with respect to content and information sharing. Such clients are simply passive clients, which are not able to directly share content with other users and which furthermore can not be seen and reached by other users of the Internet in a simple manner to the average ordinary user. Hence, there is an enormous potential for expanding the Internet to include these normally invisible and passive clients.

Several attempts have been made in order to provide a better and more transparent connectivity between clients connected to the infrastructure of the Internet, in order to share content such as digital photos and video.

US 2006/0224759 discloses a method and a system for providing peer-to-peer streaming by using a web page plug-in, which extends the functionality of a web browser to display content streamed within a peer-to-peer network. However, the source of the content to be streamed does not origin from the individual peers, but is stored in or provided from a streaming server with a central storage and/or video and audio capture means. A control server maintains a peer list, which is updated each time a peer connects to the network. When the peers are streaming content from the streaming server they can be configured to cache or temporarily store the streamed content, which then may be distributed to other peers so as to reduce the load on the streaming server.

In US 2005/0229243 is disclosed a method and a system for providing a peer running a web browser http access to a peer server located behind a firewall. The disclosure includes providing a central proxy server in the peer-to-peer network to which the server peer registers an outbound socket connection. The central proxy server handles incoming http requests from the web browser of the peer and translates the requests into request packets, which is sent to the peer server using the registered outbound socket connection. The response from the peer server is translated to a HTTP request in order to provide a flow of generic web traffic.

On the background outlined above it is the general object of the invention to provide a method and a system for identifying and connecting clients connected to the same network.

To achieve this, there is as will become apparent from the following description, provided a method according to a first aspect of the invention, carrying out the steps of connecting a first client running a web browser application to the control server and registering client specific connection information associated with the first client, receiving from the web browser application a request for an unique URI defined by the control server and associated with a second client, requesting the control server to mediate a connection to the second client associated with the unique URI, receiving connection information associated with the second client, establishing a direct connection to the second client by using the connection information associated with the second client, which connection establishment is mediated by the control server, receiving data from the second client on the direct connection and forwarding the data to the web browser application for displaying the received data in a graphical user interface.

This provides a direct communication between clients connected to the Internet by taking advantage of the exiting infrastructure and the use thereof. Hence, more content can be reached by using exiting web browsers and users of having a computer connected to the Internet can easily provide other computers access to content stored locally on the computers.

Furthermore, the present invention obviates the need for the clients to have an IP address known by the users in order to share content with each other, because the clients uses unique URIs assigned by the control server in order to identify and connect to each other. This is an advantage in mobile settings because the clients may move from one network to another, but also in private consumer setups where the typical Internet Service Provider (ISP) dynamically will change the users IP addresses through the use of DHCP.

In a preferred practical embodiment the application is a web browser application.

In a preferred embodiment, the steps according to the invention is carried out by a plug-in installed in a web browser application, which is a very simple way to add the new functionality provided by the invention to web browser applications already installed on clients. This furthermore makes it possible to utilize existing technology such as Asynchronous Pluggable Protocols for Microsoft Internet Explorer, which are registered in the browser to handle all URI's in the namespace of a new protocol for establishing direct communication between clients.

In another preferred practical embodiment the method is embedded in an operating system or a library comprising an API adapted to interact with the application.

In another practical embodiment of the invention, which also has shown to be very practical in use, the URI can be resolved using the infrastructure of the domain name system. Hence, the can be used URI to identify the location on the network of the control server.

In a particularly preferred embodiment said first and second client in the step of establishing a direct connection uses TCP or UDP hole punching mediated by said control server to establish a direct connection for communication.

This has shown to be a very reliable and effective way to establish a direct communication between clients, which furthermore limits the load on the servers of the system.

In a practically embodiment the connection information for each client registered with the control server comprises an IP address and a port number.

In an embodiment shown to be especially easy to implement the second client comprises a web server to which incoming requests from the first client is directed.

In another embodiment of the invention, the connection mediation of the control server is distributed to one or multiple levels of clients appointed as client subcontrollers.

In another embodiment, the web browser application initially receives a web page comprising an embedded web page application and wherein the following steps are carried out by the embedded web page application.

In this manner it is possible to implement the method according to the invention without modifying and installing additional software on the clients connecting to each other. The method is simply carried out in a frame of a web page and nothing is changed locally at the client. This is particularly useful for portable clients such as mobile phones and personal digital assistants with limited storage capacity and storage or when a client connects to another client for the first time.

In another aspect of the invention, the method further comprises the steps of
receiving from the control server information of accessible clients comprising unique URIs associated with the clients connected to the control server,
forwarding said information to a web browser application running on the first client for displaying the information in the graphical user interface.

In this way it is possible to get an overview of which acquainted clients are available and they can easily be accessed using the web browser application.

For the implementation of this method there is provided, according to a further aspect of the invention, a system wherein
a first client connects to the control server and registers client specific connection information associated with the first client,
a second client connects to the control server and registers client specific connection information associated with the second client,
the second client is assigned a unique URI,
the control server is requested to mediate a connection to the second client associated with the unique URI requested by a web browser application running on the first client,
the control server forwards connection information associated with the second client to the first client and connection information associated with the first client to the second client,
the control server mediates the establishment of a direct connection between the first client,
the first client receives data from the second client, which is forwarded to the web browser application and displayed in a graphical user interface.

In a practical embodiment the application is a web browser application.

In a preferred embodiment, the web browser application of at least said first client comprises a plug-in, which communicates with the control server and the second client.

In another practical embodiment, which facilitates the use of the system and the implementation of the method according to the invention, an operating system or a library of at least one client comprises an API adapted to interact with the application.

In another practical and very useful embodiment, the URI can be resolved using the infrastructure of the domain name system.

In a practical embodiment of the invention the direct connection between the first and second clients is established by using TCP or UDP hole punching mediated by the control server.

In another embodiment of the invention the connection information registered with the control server comprises an IP address and a port number.

In another practical embodiment of the invention the second client comprises a web server to which incoming requests from the first client is directed.

In a practical embodiment of the invention the first client connects to the system through an embedded web application contained in a web page provided to the first client by a mediator web service of the system.

In another embodiment of the invention, the connection mediation of the control server is distributed to one or multiple levels of clients appointed as client subcontrollers.

In another embodiment of the invention, at least the first client receives information of accessible clients from the control server comprising unique URIs associated with the clients connected to the control server,
forwards said information to a web browser application running on the first client for displaying the information in the graphical user interface.

Figure 4:
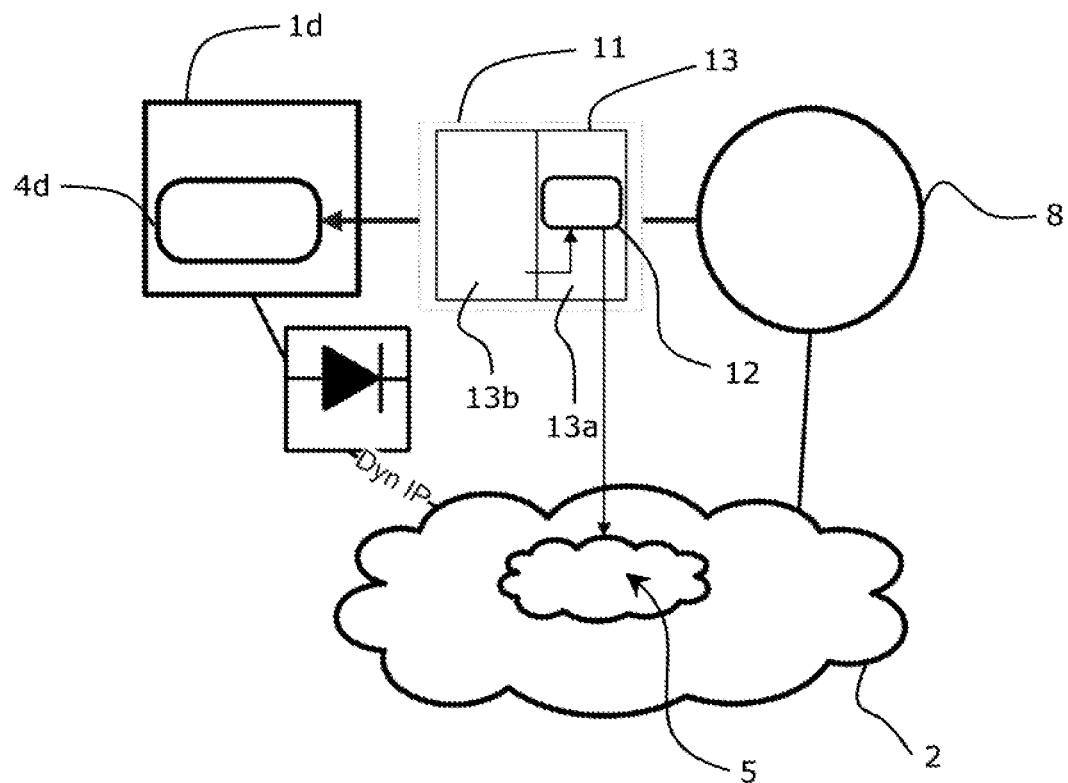
Figure 2:
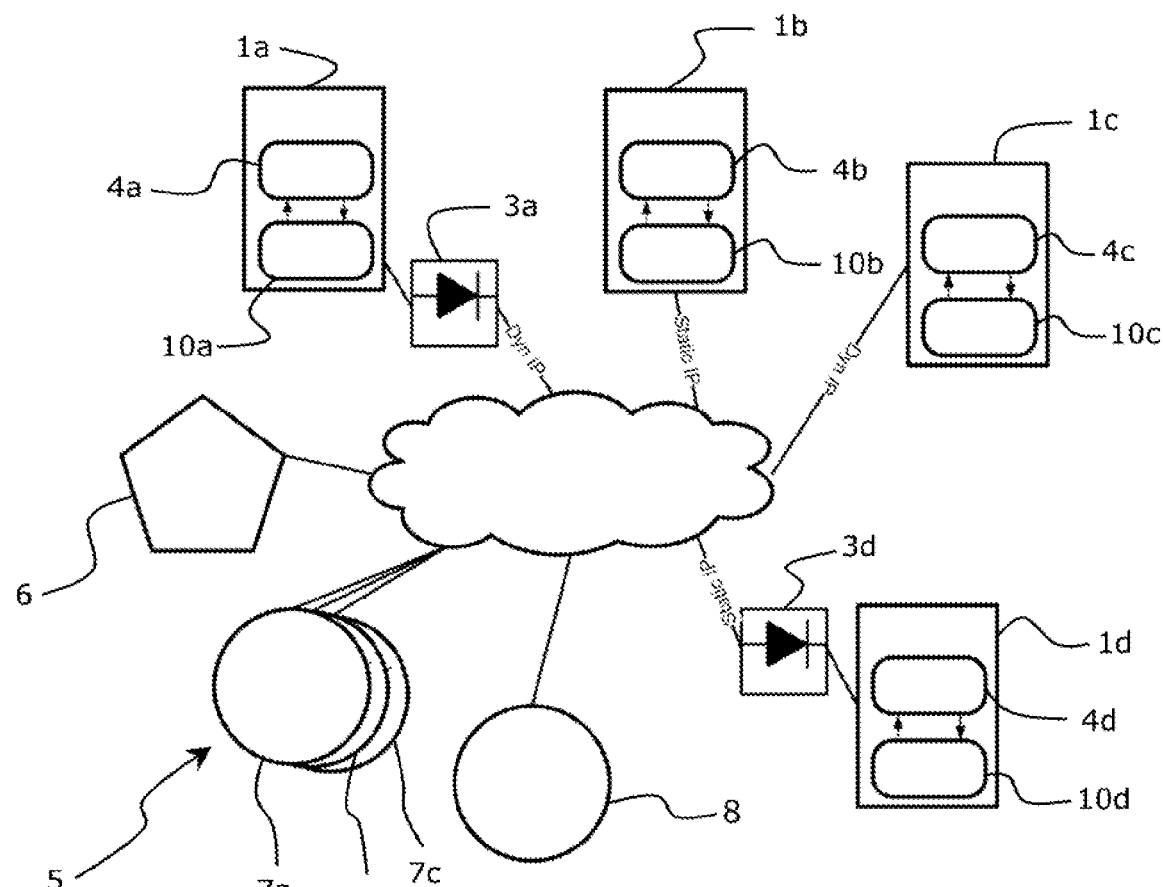
Figure 3:
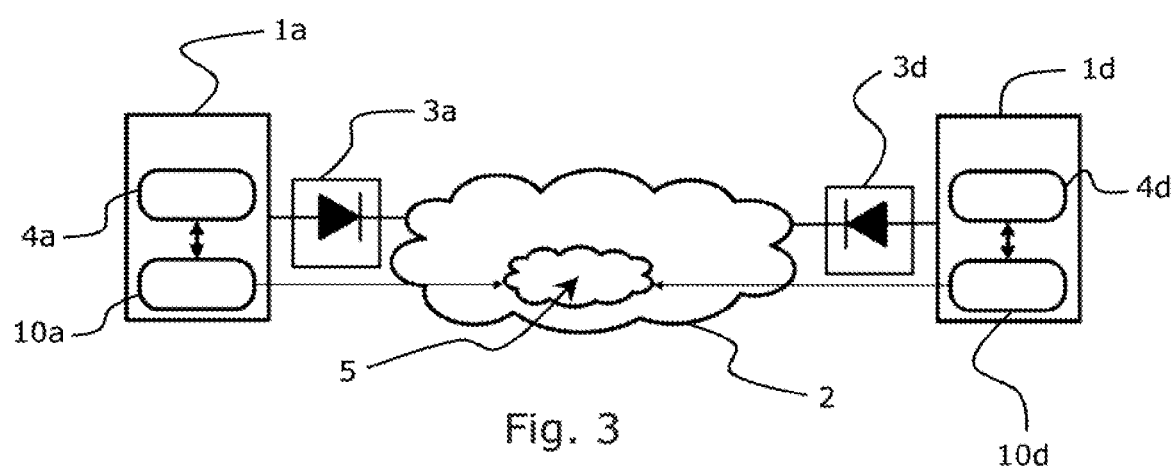

In the following the invention will be further explained by way of a preferred embodiment as illustrated by the schematic drawings, on which FIG. 1 illustrates two clients connected to the Internet,
FIG. 2 shows a system according to the invention,
FIG. 3 shows a detail of FIG. 2,
FIG. 4 shows a particular embodiment of the invention.

FIG. 1 shows two clients 1a, 1b connected to a network 2 such as the Internet. The clients 1a, 1b are typically connected to the Internet through an Internet Service provider (ISP) or local area network (LAN) of a company or a research institution. In most cases such clients are located behind a firewall 3a, 3d as illustrated in FIG. 2, which protects the clients 1a, 1d by inspecting network traffic passing through it, and denies or permits passage based on a set of rules. A firewall 3a, 3d is typically setup behind a router (not shown), which connects a small private network or for instance a LAN to the Internet. This setup makes it difficult for ordinary users to access other clients 1a-1d connected to the Internet and so the Internet is in some sense limited to clients or servers located inside the network 2. Servers (not shown) and clients located inside the network 2 are for instance web servers, which provide web content such as HTML pages or other data structures for users of the Internet. A web server can be understood as an application running on a server or a client in order to make content or services available to users of the Internet by means of web pages such as HTML documents having linked objects such as pictures and video.

Most clients 1a-1d connected to the Internet are provided with a web browser application 4a-4d for accessing and viewing content provided on the Internet by for instance web servers. This is not only the case for personal computers, but is also the case for mobile terminals with limited processing power such as personal digital assistants and mobile phones.

In FIG. 2 shows a system 5 according to the invention providing a connection infrastructure for clients 1a-1d connected to the Internet. The clients 1a-1d are using different setups for connecting to the Internet. The client 1a is located behind a firewall 3a and is for instance by an ISP provided with a different public IP address each time the client 1a connects to the Internet 2. Hence, the information necessary to connect to the client 1a changes frequently and furthermore the client 1a is located behind a firewall 3a, which controls the access to the client 1a. The client 1b is provided with a static IP address and is not located behind a firewall, which makes it relatively easy for users of other clients to access the client 1b. However, for an average user of the Internet it is not evident how to connect to another client by directly using the IP address of the client. The client 1c is also connected to the Internet without being protected by a firewall, but in contrary to the client 1b, it is provided with a dynamic IP address, which frequently changes as described above with respect to the client 1a. The client 1d is yet another possible setup used for connecting a client 1d to the Internet. The client 1d is located behind a firewall but is provided with a static IP address.

The clients 1a-1d shows the diversity in setups used for connecting clients to the Internet and moreover illustrates the fact that each client must accessed in different ways in order to establish a direct connection between two clients. The present invention addresses this problem by providing the system 5 of FIG. 2, which facilitates the user of a client such as client 1a to access another client 1b-1d no matter which setup the clients 1a-1d uses for connecting to the Internet 2. Moreover, the invention provides connections between clients without requiring the user to have knowledge of the different clients specific connection information such as IP addresses and port numbers in order to setup a direct connection between two clients 1a-1d.

In a system according to the invention as shown in FIG. 2, each of the clients 1a-1d having content to share with other clients is assigned a unique URI by the system 5. In a preferred embodiment this is done when a client with content to share registers with a control server 6 provided in the system. The clients 1a-1d having content to share is then associated with a client controller 7a-7c, which registers the URI assigned to the client and handles connection information such as a port number and an IP address associated with the clients 1a-1d. Furthermore, as will be described in more detail below, the client controller 7a-7c also mediates the setup of connections between clients. The control server 6 is the entrance to the system 5, keeping track of which client controller 7a-7c each client 1a-1d is associated with. In principle the control server 6 could also handle the tasks of the client controllers 7a-c. However, in a practical preferred embodiment of the invention the system 5 is provided with a plurality of client controllers 7a-c, which has shown to efficiently to balance the load on the system. The system of FIG. 2 also comprises a mediator web service 8, the purpose of which will be described below in more details.

If for instance client 1d wants to access content provided by client 1a, a request to the unique URI assigned to client is made in a web browser application 4 running on client 1d. The user of client 1d is typically provided with the unique URI assigned to client 1a by means of an e-mail from the user of client 1a or by activating a link on a web page located on a web server located on the Internet, which link comprises the URI assigned to the client 1a. The requested URI is forwarded to the control server 6, which checks if the particular client is associated with the requested URI is connected to the system, i.e. registered with a client controller 7a-7c. If the client is associated with the requested URI is connected to the system and a client controller 7a-7c, the client 1d is directed to the client controller 7a-7c handling the client 1a. The client controller 7a-7c communicates the request for the URI and connection information associated with client 1d to the client 1a, and correspondingly sends the connection information associated with client is to client 1d. A direct connection is then established between client 1d and client is by using TCP or UCP hole punching, which is mediated by the client controller 7a-7c handling client 1a. TCP or UCP hole punching is a well-known technique for the skilled person and solves the problem of having clients 1a, 1d located behind firewalls on private local networks. Since each client 1a-1d furthermore registers with client controller 7a-7c or the control server 6 at start-up, changing IP addresses does not pose a problem, as the clients are identified by the unique URI's assigned by the system 5 for identifying clients 1a-1d providing content to other clients 1a-1d. The direct connection and transfer of data between the clients 1a-1d furthermore has the advantage that the system does not have a limited capacity due to a central proxy service, which instead is handled by the clients 1a-1d and therefore does not become a problem in case of many users of the system. When a direct connection has been established the client 1d and 1a can exchange information, which is parsed to the web browser application of client 1d and displayed in a graphical user interface.

The clients 1a-1d of the system can obtain their public IP addresses by using Simple Traversal of UDP through NATs (STUN), which is a network protocol well known to the skilled person for allowing a client behind a router performing NAT (Network Address Translation) in order to enable multiple hosts on a private network to access the Internet using a single public IP address. This connection information is for instance used to set up UDP or TCP communication between two hosts that are both behind routers and firewalls. Hence, the actual connection associated with a client 1a-1d is twofold and comprises both the translated local IP addresses and port numbers and the real public IP address and port number, where the former is useful in case of providing a connection between two clients 1a-1b located on the same local network.

In a preferred embodiment the client is comprises a web server to which the request is forwarded and the web server answers the request with a response, which is sent directly to the client 1d, forwarded to the web browser application and displayed in a graphical user interface. The response can for instance be a web page comprising digital pictures, which is embedded in the connection established between the two clients. Hence, a user requesting a URL associated with client 1a will get the same response as if the web page was hosted on a traditional web server located on the Internet 2. This extends the scope of the Internet to include clients 1a-1d comprising a web server providing content to other clients. A web server installed on a client 1a-1d can be a simple application running on the operating system of the client 1a-1d and may comprise functionality according to the invention in order to establish a direct connection between two clients. In another embodiment the web server is installed as a separate application and the connection to other clients is provided with a web browser application.

The actual communication within the system 5, i.e. between clients 1a-1d and servers 6, 7a-7c and directly between clients 1a-d, can be based on a traditional http/TCP connection or a proprietary protocol. Hence, the actual data streams in the system 5 are not necessarily a typical Internet data stream and may only be interpreted by the systems 5.

In a preferred embodiment the method according to the invention is implemented by means of a plug-in 10*a*-10*d* for a web browser application 4*a*-4*d*. The plug-in 10*a*-10*d* can for instance be downloaded and installed the first time a client 1*a*-1*d* requests a URI defined by the system 5. The plug-in 10*a*-10*d* acts as a mediator between the web browser application 4*a*-4*d* and the system 5 and other clients 1*b*-1*d* connected to the system 5 and thereby provides the web browser application 4*a*-4*d* with a data stream for interpretation and displaying in a graphical user interface, just as if the data stream was originating from a web server located on the Internet. It is evident that the method according to the invention also could be implemented as a separate application or as an integrated part of the operating systems of the clients 1*a*-1*d*, which handles the connections with the servers 6, 7*a*-7*c* and clients 1*a*-1*d*, and provides the web browser application 4*a*-4*d* with data for displaying in the graphical user interface. In a preferred embodiment the web browser plug-in is implemented by using Asynchronous Pluggable Protocols (APPs), which allow to extend Microsoft Internet Explorer to include custom protocols that use other connection schemes than standard Internet protocols to obtain data. When implementing the method according to the invention in an operating system, the clients are provided with an application programming interface (API) of the operating system or a library adapted for providing support to requests made by applications such as a web browser application. Hence, it is possible to embed the method according to the invention in an operating system or a library of a client, which obviates any special task of the user to become a part of the system and connect to the system.

In another embodiment shown in FIG. 4 it is not possible install a plug-in 10*a*-10*d* or application on a client 1*d*. The system 5 and the other clients connected to the Internet are then reached by means of a web page 11 having an embedded web application 12. If a client such as client 1*d* then attempts to visit a URL defined by the system 5, the web browser application 4*d* of the client 1*d* is then provided with a HTML page 11 comprising a frameset 13 having two or more frames (IFrame or Frame). One of the frames comprises the embedded web application 12 such as a Java applet, Active-X or Flash, which provides the connection to the system 5 and other clients 1*a*-1*c*. Hence, the connection to the system and the other clients 1*a*-*d* is carried out in one frame 13*a* and the content provided by the other clients is displayed in another frame 13*b*. This is typically implemented by means of a mediator web service 8, which provides the client 1*d* with the HTML page 11 and mediates the connection between the embedded web application and the system 5 and the servers 6, 7*a*-7*c* clients 1*a*-1*c*.

In a preferred embodiment the system will comprises several servers in order to balance the load on the system 5. When a client 1*a*-*d*, whishing to provide content to other users starts up, it needs to know the IP address of its client controller 7*a*-*c*. By asking the existing domain name system (DNS) infrastructure to resolve the IP address of the client's own unique URL assigned and defined by the system 5, the client 1*a*-1*d* can obtain such information. At some point such a request to the DNS infrastructure will reach a DNS server (not shown) responsible for the given subdomain, which would be a server in the system 5 such as a dedicated DNS server (not shown). Upon receipt of the request the DNS server already knows which client controller 7*a*-*c* is appointed to the particular client 1*a*-1*d* or it will find a free client controller 7*a*-*c* for handling the client 1*a*-1*d*, and the IP address of this client controller 7*a*-*c* is then returned to the client 1*a*-1*d*.

For a URI request to reach a server such as the control server 6 in the system 5, the structure of the unique URI's assigned to each client 1*a*-*d* can for instance be on the form <uniqueid>.<subdomain>. <domain>.com. The partitioning into subdomains is useful for balancing the load on several servers of the system 5, each providing DNS service for the unique URI's registered under the subdomain. This furthermore has the advantage that a user of a client 1*a*-1*d* providing content to other users of the Internet whishing to use a standard DNS name such as my.picturealbum.com, can simply point the address to an URI provided by the systems 5. In this way the DNS resolver of the clients automatically ask the DNS infrastructure for the address of my.picturealbum.com, which will be an alias to the unique URI identification of a client 1*a*-1*d*.

A problem that can arise in the described system is control server 6 resource starvation. Even though the load on the control servers can be balanced to several servers such as the client controllers 7*a*-7*c*, millions or billions of clients connecting to the servers 6, 7*a*-7*c* of the network will amount to huge amount of idle connections. Such an amount of idle and open connections in even most modern operating systems is a capacity problem. Hence in a preferred embodiment, idle connections are offloaded to clients in the network, which are selected as super clients. One solution is to only offload to clients that are open to the Internet, that is, without protection of a firewall or/and NAT. This will create an inappropriate distribution of the work done by the clients connected to the system 5, which is regarded as problematic from a fairness perspective.

Therefore, a preferred embodiment of the system balances the work equally among clients. The easiest way to appoint a client to be a super client is to choose it at random. However, decisions based upon examination or prior knowledge of network topology has also shown to be applicable. Since some of the peers are behind firewalls and/or NAT or a connection with or other obstacles, the solution is to use two level STUN.

In a preferred embodiment, the super clients are randomly chosen clients 1*a*-1*d* that connect to the system 5. When the super clients are appointed, the super clients creates and initiates a STUN enabled sub client controller (subcontroller) on the clients. New ordinary clients connecting to a client maincontroller 7*a*-7*c* will be redirected to use a client subcontroller on a super client as client controller (client subcontroller) instead of directly using the client maincontrollers 7*a*-7*c*. The client subcontrollers will constantly maintain an open connection to a client maincontroller 7*a*-7*c*, and connections to the clients that are forwarded to it. The connection to the main controller 7*a*-7*c* is used for forwarding and initiating new client connections relayed from the client maincontroller 7*a*-7*c* to the client subcontroller via STUN methods. The connection to the client maincontroller 7*a*-7*c* is also used to relay connection mediation data sent from the client maincontroller 7*a*-7*c* addressed to one of the connected clients of the client subcontroller.

When a peer 1*a* requests a connection to another peer 1*b*, it first connects to 7*a*-7*c*. The client maincontroller forwards the connection mediation request to the client subcontroller a super client (not shown) that maintains the controller connection for 1*b*, and upon accept, a mediation accept request is sent back to 1*a*, and 1*a* and 1*b* can start a STUN connection. In another client 1*a* is redirected to make a connection to the client subcontroller, which mediates the connection between client 1*a* and 1*b*, by direct communication with both parties. It is evident that introducing multiple levels of client subcontrollers can further enhance this embodiment.

A typical client 1a-1d appointed as super client is able to without problems to manage hundreds, maybe thousand of idle connections, because the client needs only one connection to the client controller.

Whereas the method and system of the invention have been described in the foregoing mainly with reference to a single currently preferred implementation, the scope of the invention will include alternative embodiments making use of other types of standard communication networks and other transmission modes within the definitions provided by the appended claims.

The invention claimed is:

1. A method for identifying and connecting clients connected to the same network comprising several control servers, comprising the steps of
    connecting a first client running a web browser application to one of the several control servers, wherein the control server connected to the first client registers client specific connection information associated with the first client,
    receiving from the web browser application a request for a unique URI defined by one of the control servers and associated with a second client,
    requesting a control server connected to the second client to mediate a connection to the second client associated with the unique URI,
    receiving connection information associated with the second client,
    establishing a direct connection to the second client by using the connection information associated with the second client, which connection establishment is mediated by the control server connected to the second client,
    receiving data from the second client on the direct connection and forwarding the data to the web browser application for displaying the received data in a graphical user interface,
    the steps are carried out by a plug-in installed in said web browser application, which plug-in communicates with the control server connected to the first client and the control server connected to the second client,
    the URI assigned to the second client by the control server connected to the second client is a URL that can be resolved using the infrastructure of the domain name system,
    the second client comprises a web server to which incoming requests from the first client are directed, and
    the second client asks the existing domain name system infrastructure to resolve the IP address of the client's own unique URL assigned and defined by the control server connected to the second client in order to obtain the IP address of the second client's control server.

2. A method according to claim 1, wherein the method is embedded in an operating system comprising an API adapted to interact with the web browser application.

3. A method according to claim 1, wherein said first and second client in the step of establishing a direct connection uses TCP or UDP hole punching mediated by said control server connected to the second client to establish a direct connection for communication.

4. A method according to claim 3, wherein the connection information for each client comprises an IP address and a port number.

5. A method according to claim 1, wherein the connection mediation of the control server connected to the second client is distributed to one or multiple levels of clients appointed as client subcontrollers.

6. A method according to claim 1, further comprising the initial step of
    the web browser application initially receives a web page comprising an embedded web page application and wherein subsequent steps are carried out by the embedded web page application.

7. A method according to claim 1, further comprising the steps of
    receiving from the control servers information of accessible clients comprising unique URIs associated with clients connected to the control servers,
    forwarding said information to the web browser application running on the first client for displaying the information in the graphical user interface.

8. A system for identifying and connecting devices connected to the same network, the system comprising at least one processor and a memory coupled to the at least one processor and several control servers, a first device, and a second device, the second device comprising a web server, wherein
    a first device running a web browser application connects to one of the control servers, and wherein the control server connected to the first device registers specific connection information associated with the first device,
    a second device connects to one of the control servers, and wherein the control server connected to the second device registers device specific connection information associated with the second device,
    the second device is assigned a unique URI,
    the control server connected to the second device is requested to mediate a connection to the second device associated with the unique URI by the web browser application running on the first device,
    the control server connected to the second device forwards connection information associated with the second device to the first device, and the control server connected to the first device forwards connection information associated with the first device to the second device,
    the control server connected to the second device mediates the establishment of a direct connection between the first device and the second device,
    the first device receives data from the second device, which are forwarded to the web browser running on the first device and displayed in a graphical user interface,
    the web browser application comprises a plug-in, which communicates with the control server connected to the first device and the control server connected to the second device,
    the URI assigned to the second device by the control server connected to the second device is a URL that can be resolved using the infrastructure of the domain name system,
    the second device comprises a web server to which incoming requests from the first device are directed, and
    the second device asks the existing domain name system infrastructure to resolve the IP address of the device's own unique URL assigned and defined by the control server connected to the second device in order to obtain the IP address of the second device's control server.

9. A system according to claim 8, wherein an operating system comprises an API adapted to interact with the web browser application.

10. A system according to claim 8, wherein the direct connection between the first and second devices is established by using TCP or UDP hole punching mediated by the control server connected to the second device.

11. A system according to claim 8, wherein the connection information for each device comprises an IP address and a port number.

12. A system according to claim 8, wherein the connection mediation of the control server connected to the second device is distributed to one or multiple levels of devices appointed as device subcontrollers.

13. A system according to claim 8, wherein the first device connects to the system through an embedded web application contained in a web page provided to the first device by a mediator web service of the system.

14. A system according to claim 8, wherein at least the first device
- receives from the control servers information of accessible devices comprising unique URIs associated with devices connected to the control servers,
- forwards said information to a web browser application running on the first device for displaying the information in the graphical user interface.

* * * * *